INVENTOR.
JOSEPH W. DONNELLY
BY Arthur H. Seidel
ATTORNEY

June 22, 1965  J. W. DONNELLY  3,190,188
GLASS FORMING APPARATUS HAVING SELF-ACCOMMODATING PLUNGERS
Filed Aug. 25, 1960  3 Sheets-Sheet 3

INVENTOR.
JOSEPH W. DONNELLY
BY Arthur H. Seidel
ATTORNEY

United States Patent Office 3,190,188
Patented June 22, 1965

3,190,188
GLASS FORMING APPARATUS HAVING SELF-ACCOMMODATING PLUNGERS
Joseph W. Donnelly, Vineland, N.J., assignor to Maul Brothers, Inc., Millville, N.J., a corporation of New Jersey
Filed Aug. 25, 1960, Ser. No. 51,829
11 Claims. (Cl. 91—414)

This invention relates to glass forming apparatus having self-accommodating plungers. More particularly, this invention relates to glass forming apparatus having a pair of plunger casings which are "free" floating so that the plungers within the casings for forming glassware may be individually self-accommodating to their respective molds.

It has become increasingly popular in the glassware industry to utilize glass making apparatus of the type wherein a plurality of plungers are provided in a single mechanism to form simultaneously a plurality of hollow glass parisons. An example of such an apparatus is shown in U.S. Patent 2,508,891. The apparatus in said patent suffers from several defects, namely, the plungers are restricted to simultaneous movement and the plungers are not individually adjustable or self-accommodating with respect to their molds.

There is shown in U.S. Patent 2,702,444, a very complicated apparatus wherein the plungers are individually operable. Neither of the above patents permit one plunger to be self-accommodating with respect to its mold and adjustable with respect to the other plunger since the plungers are mounted within a single casing. Due to manufacturing tolerances, inherent defects in the grain structure of materials, and wear due to use, the alignment of the various plungers with respect to their molds are all slightly different from one another.

The present invention overcomes the above problems by positioning the plungers in "free" floating cylinders capable of being adjusted vertically as a unit. In this manner, the optimum relationship between a plunger in a press-and-blow operation or a neck pin in a press-and-blow operation and the molds will be automatically attained.

It is an object of the present invention to provide a novel glass forming apparatus.

It is another object of the present invention to provide a novel glass forming apparatus having "free" floating casings vertically adjustable as a unit.

It is another object of the present invention to provide a novel glass forming apparatus having plungers individually self-accommodating with respect to their molds.

It is still another object of the present invention to provide a novel glass forming apparatus having a plurality of plungers each individually operable for the formation of glassware independent of the other plungers, which apparatus is simpler than the devices used heretofore.

It is still another object of the present invention to provide a novel glass forming apparatus having a separately operable supply and exhaust valve means for operating each plunger within its respective casing.

It is a further object of the present invention to provide a novel glass forming apparatus having "free" floating casings rotatable about their longitudinal axes, and each casing being a limit stop for the extent of rotary movement of the adjacent casing.

It is a further object of the present invention to provide a novel glass forming apparatus of the plural cavity type capable of being vertically adjusted as a unit, wherein each casing may have rotary and spacial movement with respect to the other casing.

Other objects will appear hereinafter.

For the purpose of illustrating the invention there is shown in the drawings a form which is presently preferred; it being understood, however, that this invention is not limited to the precise arrangements and instrumentalities shown.

FIGURE 5 is an elevational view of a conventional press-and-blow plunger.

Referring to the drawing in detail, wherein like numerals indicate like elements, there is shown in FIGURE 1 a portion of the glass forming apparatus of the present invention designated generally as 10.

Figure 1:
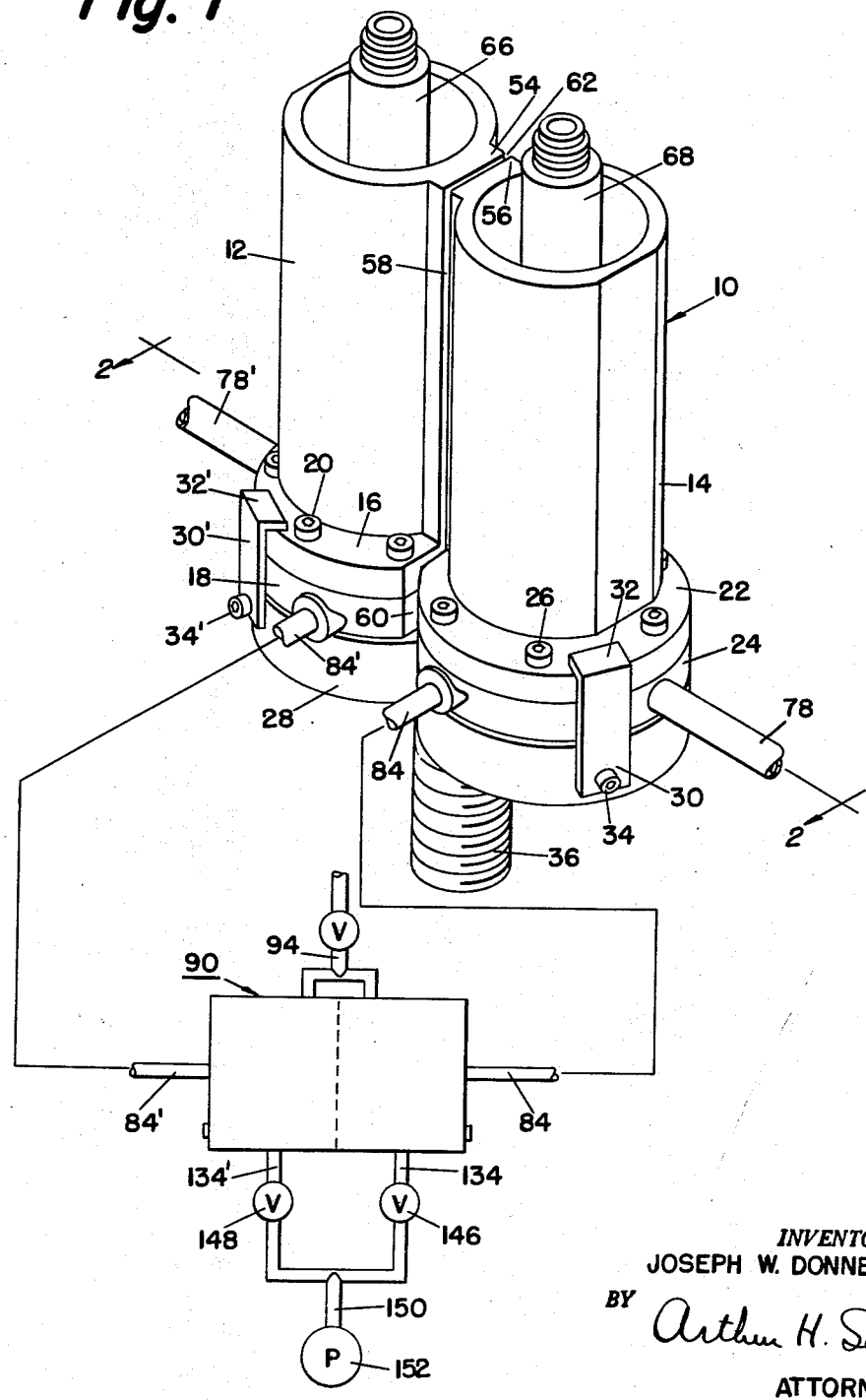
FIGURE 1 is a perspective view of the plunger casings in a glass forming apparatus of the present invention with the hydraulic system therefor shown schematically.

The portion of the glass forming apparatus 10 comprises a pair of cylindrical casings 12 and 14. The cylindrical casing 12 is provided with an integral flange 16 which is fixedly secured to its base 18 by a plurality of bolts 20. The casing 14 is provided with an integral flange 22 which is fixedly secured to its base 24 by a plurality of bolts 26.

The base 18 and the base 24 of the casings 12 and 14 are supported on a base plate 28. The base 24 is maintained juxtaposed to the base plate 28 by a mounting bracket 30. The mounting bracket 30 is provided with a flange 32 which extends over the upper surface of the flange 22 and the body of the bracket 30 is fixedly secured to the base plate 28 by a bolt 34. A similar mounting bracket 30' is provided for the casing 12. Since the bracket 30' is identical with the bracket 30, it need not be discussed in detail.

Figure 2:
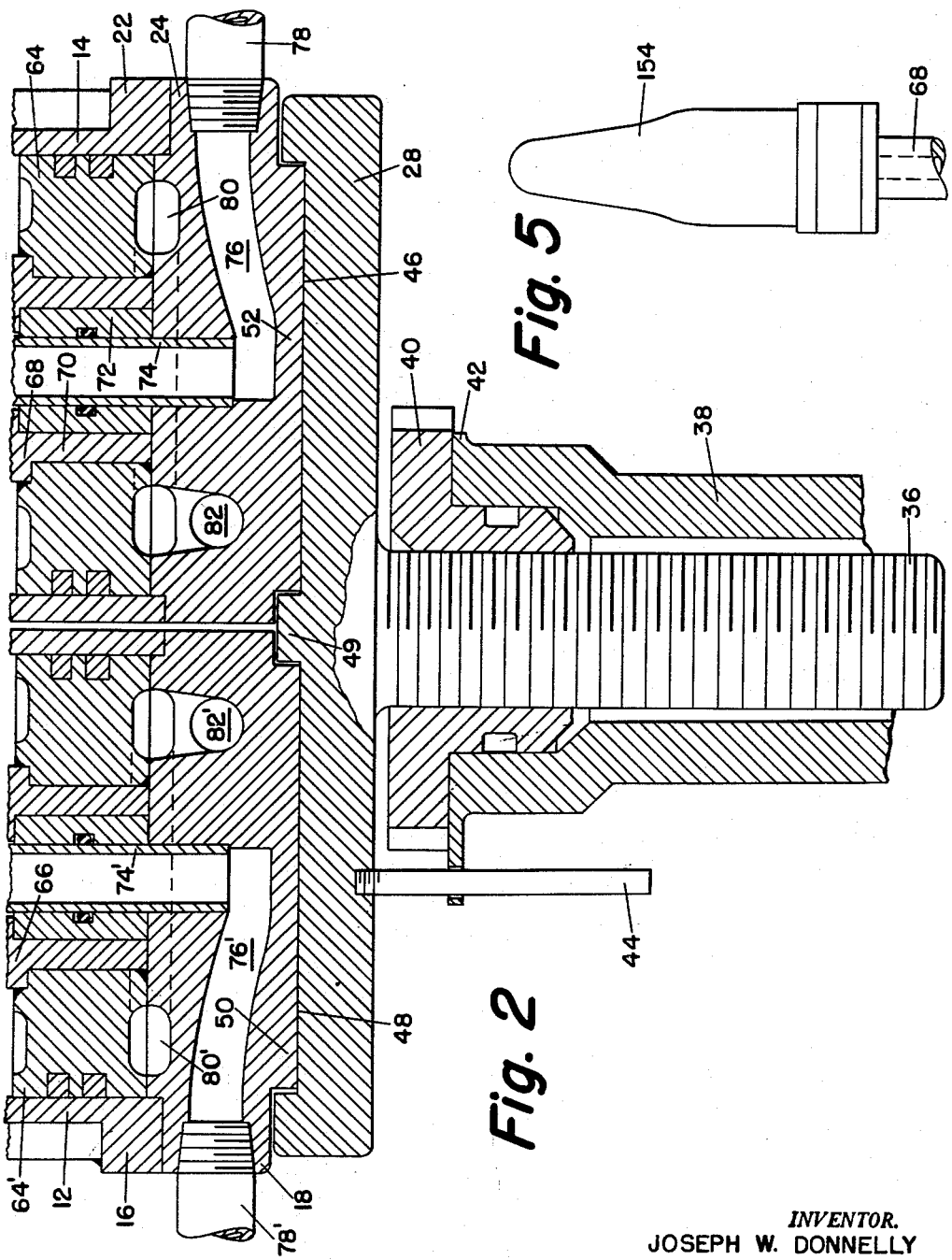
FIGURE 2 is a partial sectional veiw taken along the lines 2—2 in FIGURE 1.

The base plate 28 is provided with a mounting post 36 which extends downwardly from the lower surface of the base plate 28, as seen more clearly in FIGURE 2. The mounting post 36 extends through a tubular sleeve 38. A gear 40 is supported on the flange 42 of the sleeve 38 and is provided with a central bore threaded to the outer periphery of the mounting post 36. The lower portion of the mounting post 36 is provided with threads adapted to cooperate with gear 40 and structure well known to those skilled in the art for adjusting the vertical position of the base plate 28. For example, such structure may be of the type shown in U.S. Patent 2,637,944. The actuating mechanism for the mounting post 36 will be of the non-rising type and a guide pin 44 is fixedly secured to the lower surface of the base plate 28 for cooperation with a flange on the sleeve 38 so as to prevent rotary movement of the base plate 28.

The base plate 28 is provided with a pair of spaced circular recesses 46 and 48 on its upper surface. The recesses 46 and 48 are spaced from one another by the ridge 49 on the upper surface of the base plate 28. The base 18 on the casing 12 is provided on its lowermost surface with an axially extending boss 50. The boss 50 has a height which is slightly greater than the depth of the recess 48 so that the base 18 is spaced from the upper surface of the base plate 28 by a short distance. The boss 50 is circular in transverse cross section and has transverse dimensions slightly smaller than the transverse dimentions of the recess 48.

The base 24 on the casing 14 is provided with a boss 52 which is identical with the boss 50. Since the boss 52 cooperates with the recess 46 in the same manner as the boss 50 cooperates with the recess 48, its dimensional relationship with the recess 46 need not be repeated.

Each of the casings 12 and 14 are provided with longitudinally extending bosses. The casing 12 is provided with a longitudinally extending boss 54 and the casing 14 is provided with a longitudinally extending boss 56. The bosses 54 and 56 are an integral part of the casings 12 and 14 and cooperate with one another as will be made clear hereinafter. It will be noted that the bosses 54 and 56 have a thickness within the plane defined by the longitudinal axes of the casings 12 and 14 which is equal to the thickness of the casings 12 and 14 at other spaced points around the periphery thereof. In this manner, it is possible to maintain the longitudinal axes of the cylinders 12 and 14 as close together as possible.

The boss 54 is provided with a planar face 58 which extends across the flange 16. The base 18 for the casing 12 is provided with a planar face 60 which is an extension of the planar face 58. The boss 56 and the base 24 are also provided with a planar face which is juxtaposed to the planar faces 58 and 60 and spaced therefrom by a short gap 62.

Referring in detail to FIGURE 2, it will be noted that a piston 64 is disposed within the bore of the casing 14. A piston 64' is disposed within the bore of the casing 12. A piston rod 66 is fixedly secured to the piston 64' in any convenient manner such as welding. A piston rod 68 is fixedly secured to the piston 64 in like manner. Since the construction of the casings 12 and 14 and the elements disposed therein are identical, it is deemed sufficient to only describe these elements within one casing. Thus, only the elements within casing 14 will be described in detail, and the corresponding elements within casing 12 will be shown with the identical numerals which are primed.

As shown more clearly in the right hand portion of FIGURE 2, the piston rod 68 is hollow and is provided with a tubular extension 70. A sleeve-like bushing 72 is disposed within the tubular extension 70 and is fixedly secured thereto. A hollow tube 74 is fixedly secured at one end to the base 24 and extends upwardly through the bushing 72 and the piston rod 68. The hollow tube 74 is in communication at its lower end with a passage 76 in the base 24. A conduit 78 is threadedly engaged with the base 24 and is in communication with the passage 76. The conduit 78 is adapted to be connected with a source of cool dry air under pressure for cooling the plungers adapted to be mounted on the piston rods 66 and 68 as is well known in the art.

The upper surface of the base 24 is provided with an annular groove 80. The lower surface of the piston 64 is provided with a mating groove. The groove 80 is in communication with a passage 82 in the base 24. As shown more clearly in FIGURE 1, the passage 82 is in communication with a conduit 84 which supplies pressurized fluid for causing the piston 64 to reciprocate in a vertical direction.

Figure 3:
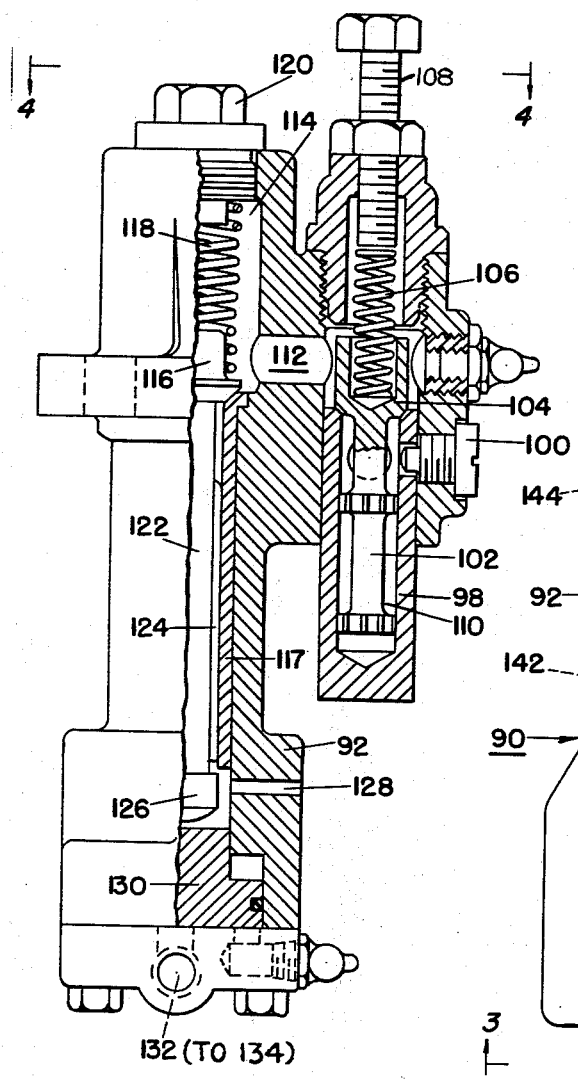
FIGURE 3 is a partial sectional view of the supply and exhaust valve means taken along the lines 3—3 in FIGURE 4.
Figure 4:
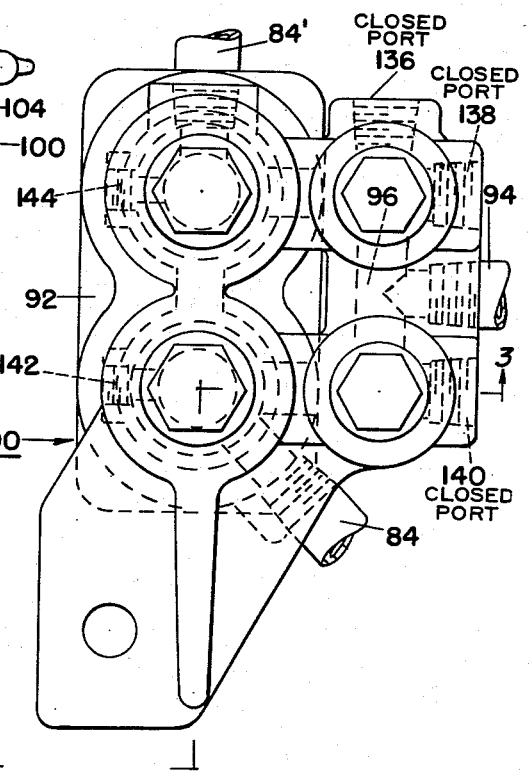
FIGURE 4 is a top plan view of the supply and exhaust valve means looking in the direction of the arrows 4—4 in FIGURE 3.

The supply of pressurized fluid for actuating the piston 64 is controlled by a supply and exhaust valve means 90. Referring more particularly to FIGURES 3 and 4, it will be seen that the supply and exhaust valve means 90 comprises a valve housing 92. The valve housing 92 comprises a pair of valve means individually operable to supply an exhaust pressure from the chamber beneath the piston 64 and the chamber beneath the piston 64'. The valve means for causing reciprocal motion of the pistons 64 and 64' are identical, and therefore only one such valve means will be described in detail.

The valve housing 92 is provided with an inlet conduit 94 which is in communication with a source of pressurized fluid. The inlet conduit 94 is in communication with a T-shaped passage within the housing 92. One arm of the T-shaped passage 96 delivers pressurized fluid to one pilot valve while the other arm of the T-shaped passage delivers pressurized fluid to the other pilot valve.

As shown more clearly in FIGURE 3, the pilot valves are mounted within a sleeve 98 fixedly secured within a bore through the housing 92 by a screw 100. A pilot valve member 102 has its major portion disposed within the sleeve 98 and is provided with an enlarged head 104 which cooperates with a valve seat on the upper end on the sleeve 98 to control flow of the pressurized fluid. The pilot valve member head 104 is biased against its seat by a spring 106. An adjustable bolt 108 is threaded through a bonnet and is engaged with one end of the spring 106 for adjusting the tension thereof. The lower portion of the pilot valve member 102 is disposed within a suitable liquid such as oil 110 for dampening the movement of the pilot valve member 102. As shown in FIGURE 3, one arm of the T-shaped passage 96 is in communication with the chamber within the sleeve 98 below the head 104.

The outlet side of the pilot valve is in communication with the inlet chamber 114 by way of the passage 112. A tappet valve 116 is provided with a head which is disposed within the inlet chamber 114. The head of the tappet valve 116 is biased against a seat on the upper edge of a sleeve 117 by a spring 118. The tension of the spring 118 is selectively adjustable by the bolt 120 which is threaded to the valve housing 92. The head of the tappet valve 116 is provided with a stem 122 which extends through the sleeve 17. The outer periphery of the stem 122 is provided with flutes 124 which engage the inner periphery of the sleeve 117. The lower end of the stem 122 is provided with a tappet 126. The tappet 126 is provided with an external diameter slightly less than the internal diameter of the sleeeve 117. The lower portion of the valve housing 92 is provided with a plurality of radially extending bores 128 which provide communication between the atmosphere and the space between adjacent flutes 124 on the stem 122 for a purpose to be made clear hereinafter. A piston 130 is disposed below the tappet 126 within the valve housing 92. The housing 92 is provided with an end wall below the piston 130. A passage 132 is provided in the end wall for delivering pressurized fluid to the lowermost surface of the piston 130. The passage 132 is in communication with a source of pressurized fluid by means of the conduit 134 as shown more clearly in FIGURE 1.

Referring in particular to FIGURE 4, it will be seen that the valve housing 92 is provided with a plurality of ports 136, 138 and 140. These last mentioned ports will be closed by an Alemite fitting. A port 142 in the valve housing 92 is in communication with the inlet chamber 114 and is adapted to be connected to a pressure gauge. A similar port 144 for the other tappet valve is also adapted to be connected to a pressure gauge. The conduit 84 which supplies an exhaust fluid from the chamber beneath the piston 64 communicates with the bore of the sleeve 117 beneath the head of the tappet valve 116. In the present position of the tappet valve 116, as shown in FIGURE 3, the chamber beneath the piston 64 is in communication with atmosphere by way of the space between the flutes 124 and the bore 128.

As shown schematically in FIGURE 1, the conduits 134 and 134', which supply pressurized fluid to the lower surface of the pistons for actuating the tappet valves, are provided with individually operable valves 146 and 148. The valves 146 and 148 are in communication with a conduit 150. The conduit 150 is connected to the outlet side of a pump 152 for delivering pressurized fluid to the pistons beneath the tappet valves.

When valve 146 is open, pressurized fluid from the pump 152 is communicated to the lower surface of the piston 130, thereby raising said piston 130. When the piston 130 is raised, the tappet 126 is moved vertically to a position within the sleeve 117 thereby closing the communication between atmosphere and the space between the flutes 124. At the same time, the head of the tappet valve 116 is raised thereby compressing the spring 118. Any pressure within the inlet chamber 114 and the passage 112 will be immediately in communication with the conduit 84. The resultant decrease in pressure will thereby enable the pressure of the fluid within the T-shaped passage 96 to raise the head of the pilot valve member 102 upwardly against the tension of the spring 106. Thus, fluid from a pressurized source in communication with the inlet conduit 94 will be in communication with the groove 80 beneath the piston 64. The introduction of pressurized fluid beneath the piston 64 causes said piston 64 to move vertically thereby moving a plunger or neck pin to a glass forming position. The plunger or neck pin may be of the type having a positioner removable as a unit as set forth in my copending application Serial No. 51,904 filed on August 25, 1960 and entitled Apparatus for Forming Glassware.

When the valve 146 is moved to its closed position, the pressure beneath the piston 130 is reduced by bleeding the fluid out to atmosphere and the spring 118 biases the head of the tappet valve 116 to its closed position against the seat on the upper end of the sleeve 117. At the same time, the tappet valve 116 will be moved to the position shown in FIGURE 3 so that the conduit 84 will now be in communication with atmosphere by way of the space between the flutes 124 and the radial bores 128.

As the piston 64 is raised vertically, the plunger 154 on the end of piston rod 68 is moved to a glass forming position within a mold. The relationship between the casings 12, 14 and the base plate 28 enables the plunger 154 to be self-accommodating with respect to its mold. The casings 12 and 14 are "free" floating with respect to each other and the base plate 28 so that the plungers on the piston rods 66 and 68 may be self-accommodating with respect to their molds and have rotary as well as spacial relative movement. The difference in the transverse dimensions between the bosses 50 and 52 with relation to the recesses 46 and 48 permits spacial relative movement. The rotary movement of the casings 12 and 14 is limited by the planar faces on the longitudinally extending bosses 54 and 56. For example, casing 14 may rotate about its longitudinal axis until the planar face on the longitudinally extending boss 56 abuts the planar face 58 on the longitudinally extending boss 54. The mounting brackets 30 and 30' do not interfere with rotary or spacial movement of the casings 12 and 14 since the flanges 32 and 32' are spaced from the upper surface on the flanges 16 and 22. The flanges 32 and 32' prevent the casings 12 and 14 from moving vertically in the event that the plungers become stuck to the parison.

The casings 12 and 14 are movable vertically as a unit by the mounting post 36 which is fixedly secured to the lower surface of the base plate 28. Thus, it will be seen that the casings 12 and 14 have limited rotary and spacial movement as well as vertical reciprocation as a unit. In this manner, the optimum relationship between a plunger in a press-and-blow operation or a neck pin in a press-and-blow operation and the molds will be automatically attained. At the same time, the pistons 64 and 64' are each individually operable independent of the other so that the apparatus 10 of the present invention may be utilized as a single or a plural cavity mechanism.

Conduits (not shown) will be provided for delivering pressurized fluid to the space above the pistons 64 and 64' for positively biasing the pistons 64 and 64' to the position shown in FIGURE 2.

As used hereinafter, the words "free floating adjustment" are to be interpreted as meaning that the casings are capable of selective adjustment in a manner whereby the longitudinal axes of the casings may be moved toward and away from one another and that the casings may be selectively rotated about their longitudinal axes with respect to one another.

The present invention may be embodied in other specific forms without departing from the spirit or essential attributes thereof and, accordingly, reference should be made to the appended claims, rather than to the foregoing specification as indicating the scope of the invention.

I claim:

1. In an apparatus for forming glassware comprising a base plate, means mounting a pair of cylindrical casings on said base plate for providing individual self-adjustment of said casings and maintaining said casings in any disposition with respect to each other, an element on said base plate adapted to be connected to a device for raising and lowering said base plate and casings as a unit, a piston rod in each casing, a piston means on one end of each piston rod within its respective casing, and a means including separate fluid conduits connected to each casing for conveying a fluid to selectively reciprocate each piston means within its respective casing independent of the other piston means.

2. In an apparatus in accordance with claim 1 wherein said mounting means comprises a boss on at least one of said casings, a recess on said base plate receiving said boss, said recess having a configuration substantially identical with the configuration of said boss, said recess having a transverse dimension slightly greater than the transverse dimension of said boss, whereby said one casing may be adjusted relative to the other casing.

3. In an apparatus in accordance with claim 2 wherein said adjustment includes limited rotary movement about the longitudinal axis of said one casing as well as spacial adjustment relative to said other casing.

4. In an apparatus for forming glassware comprising a base plate, means mounting a pair of cylindrical casings on said base plate for providing individual adjustment of said casings and maintaining said casings in any pre-set disposition with respect to each other, an element on said base plate adapted to be connected to a device for raising and lowering said base plate and casings as a unit, a piston rod in each casing, a piston means on one end of each piston rod within its respective casing, and a means including separate fluid conduits connected to each casing for conveying a fluid to selectively reciprocate each piston means within its respective casing independent of the other piston means, means on juxtaposed peripheral surfaces of said casings, said mounting means providing for rotary movement of said casings about their longitudinal axes, said means on said juxtaposed peripheral surfaces cooperating with each other to limit the extent of rotary movement of said casings.

5. In an apparatus in accordance with claim 4 wherein said means on juxtaposed peripheral surfaces of said casings comprises longitudinally extending planar surfaces.

6. In an apparatus in accordance with claim 5 wherein said planar surfaces are on longitudinally extending bosses, the thickness of said bosses in the plane defined by the longitudinal axes of said casings being substantially identical with the wall thickness of said casings.

7. In apparatus for forming glassware comprising a base plate, means mounting a pair of cylindrical casings on said base plate for limited selective rotational and spacial self-adjustment of said casings with respect to each other, a mounting post on said base plate adapted to be connected to a device for raising and lowering said base plate and casings as a unit, a piston rod attached to a piston means in each casing, a means including separate fluid conduits connected to each casing for conveying a fluid to selectively reciprocate each piston means within its respective casing independent of the other piston means, and a supply and exhaust valve means connected to said fluid conduit means for selectively supplying pressurized fluid to each of said piston means independent of the supply of pressurized fluid to the other piston means, said supply and exhaust valve means comprising a selectively operable valve member for each casing, said valve members being mounted within a single valve housing.

8. In an apparatus for forming glassware comprising a substantially planar base plate, a pair of spaced recesses on the upper surface of said base plate, a pair of tubular casings supported by said base plate on said upper surface with the longitudinal axis of said casings being substantially perpendicular to the plane of said base plate, a portion of each casing having a transverse dimension slightly less than the transverse dimensions of said recesses, each portion of one casing being received within one of said recesses, whereby the longitudinal axis of one casing may be adjusted toward and away from the longitudinal axis of the other casing, mechanical means connected to a central portion of the bottom surface of said base plate for moving the base plate and said casings as a unit in a direction substantially parallel to the longitudinal axes of said casings, each of said portions of said casings being axial bosses on one end of said casings, said bosses having a transverse dimension less than the transverse dimension of its casing, said bosses having a height slightly greater than the depth of said recesses.

9. In an apparatus in accordance with claim 8 including a mounting bracket for each casing, each mounting bracket being fixedly secured to said base plate, each mounting bracket having a flange extending over a portion of a separate one of said casings.

10. In apparatus for forming glassware comprising a substantially planar base plate, a pair of spaced recesses on the upper surface of said base plate, a pair of tubular casings supported by said base plate on said upper surface with the longitudinal axis of said casings being substantially perpendicular to the plane of said base plate, a portion of each casing having a transverse dimension slightly less than the transverse dimensions of said recesses, each portion of one casing being received within one of said recesses with the clearance between the outside diameter of each portion and the inside diameter of its respective recess being sufficient to enable the longitudinal axis of one casing to be adjusted toward and away from the longitudinal axis of the other casing, means to maintain the casings in a pre-set spatial relationship, and mechanical means connected to a central portion of the bottom surface of said base plate for moving the base plate and said casings as a unit in a direction substantially parallel to the longitudinal axes of said casings.

11. In an apparatus for forming glassware comprising a substantially planar base plate, a pair of cylindrical casings supported on the upper surface of said base plate with the longitudinal axes of said casings being substantially perpendicular to the plane of said base plate, piston means reciprocally disposed within each casing, means including conduits connected to each casing at the end of each casing closest to said base plate for conveying fluid to a separate one of said piston means, and means mounting each casing on said base plate for selective limited rotary and spacial movement with respect to the other casing.

References Cited by the Examiner
UNITED STATES PATENTS

| | | | |
|---|---|---|---|
| 1,394,679 | 10/21 | Johns | 121—158 |
| 2,228,700 | 1/41 | Hamner et al. | 60—97 |
| 2,309,378 | 1/43 | Berthold | 49—76 |
| 2,508,240 | 5/50 | Fenn | 254—89 |
| 2,508,891 | 5/50 | Rowe | 60—97 X |
| 2,511,184 | 6/50 | Walling | 60—52 |
| 2,702,444 | 2/55 | Rowe | 49—91 |
| 2,837,058 | 6/58 | Taylor | 92—146 X |

FOREIGN PATENTS

| | | |
|---|---|---|
| 535,028 | 2/55 | Belgium. |
| 1,175,790 | 11/58 | France. |

JULIUS E. WEST, *Primary Examiner.*

ARTHUR P. KENT, EDGAR W. GEOGHEGAN, ABRAM BLUM, *Examiners.*